United States Patent [19]

Hanway, Jr. et al.

[11] 4,166,032
[45] Aug. 28, 1979

[54] METHOD AND APPARATUS FOR REMOVING HEAVY METALS FROM WASTE WATER STREAMS

[76] Inventors: John E. Hanway, Jr., P.O. Box 18, Naperville, Ill. 60540; Richard G. Mumford, 1861 Jefferson, San Francisco, Calif. 94123

[21] Appl. No.: 664,961

[22] Filed: Mar. 8, 1976

[51] Int. Cl.$^2$ .............................................. B01D 15/06
[52] U.S. Cl. .................................... 210/32; 210/38 B; 210/54 R
[58] Field of Search ...................... 210/38 B, 54 R, 52, 210/24, 36, 42 R, 45, 51, 32, 54 A, 54 C

[56] References Cited

U.S. PATENT DOCUMENTS

| 3,892,688 | 7/1975 | Motani et al. ....................... 210/38 B |
| 3,947,354 | 3/1976 | Swanson et al. .................... 210/54 R |

FOREIGN PATENT DOCUMENTS 46-39544  6/1967  Japan .......................................... 210/54

OTHER PUBLICATIONS

Wing, R. E.; "Heavy Metal Removal from Wastewater with Starch Xanthate"; Proceed. 29th Ind. Waste Conf., Purdue University (May 1974); pp. 348–356.

Primary Examiner—Benoit Castel
Attorney, Agent, or Firm—Flehr, Hohbach, Test, Albritton & Herbert

[57] ABSTRACT

Heavy metals in a waste water stream are contacted with fibrous cellulose xanthate (e.g., sodium based) and removed from the stream by chemisorption. After separation from the waste water stream, the heavy metals are stripped from the chemisorbed cellulose xanthate and recovered. The stripped cellulose is then converted to regenerated cellulose xanthate which is employed for further treatment of waste water. In a preferred technique, the cellulose xanthate is formed into a porous fibrous bed through which the waste water stream is continuously passed.

14 Claims, 1 Drawing Figure

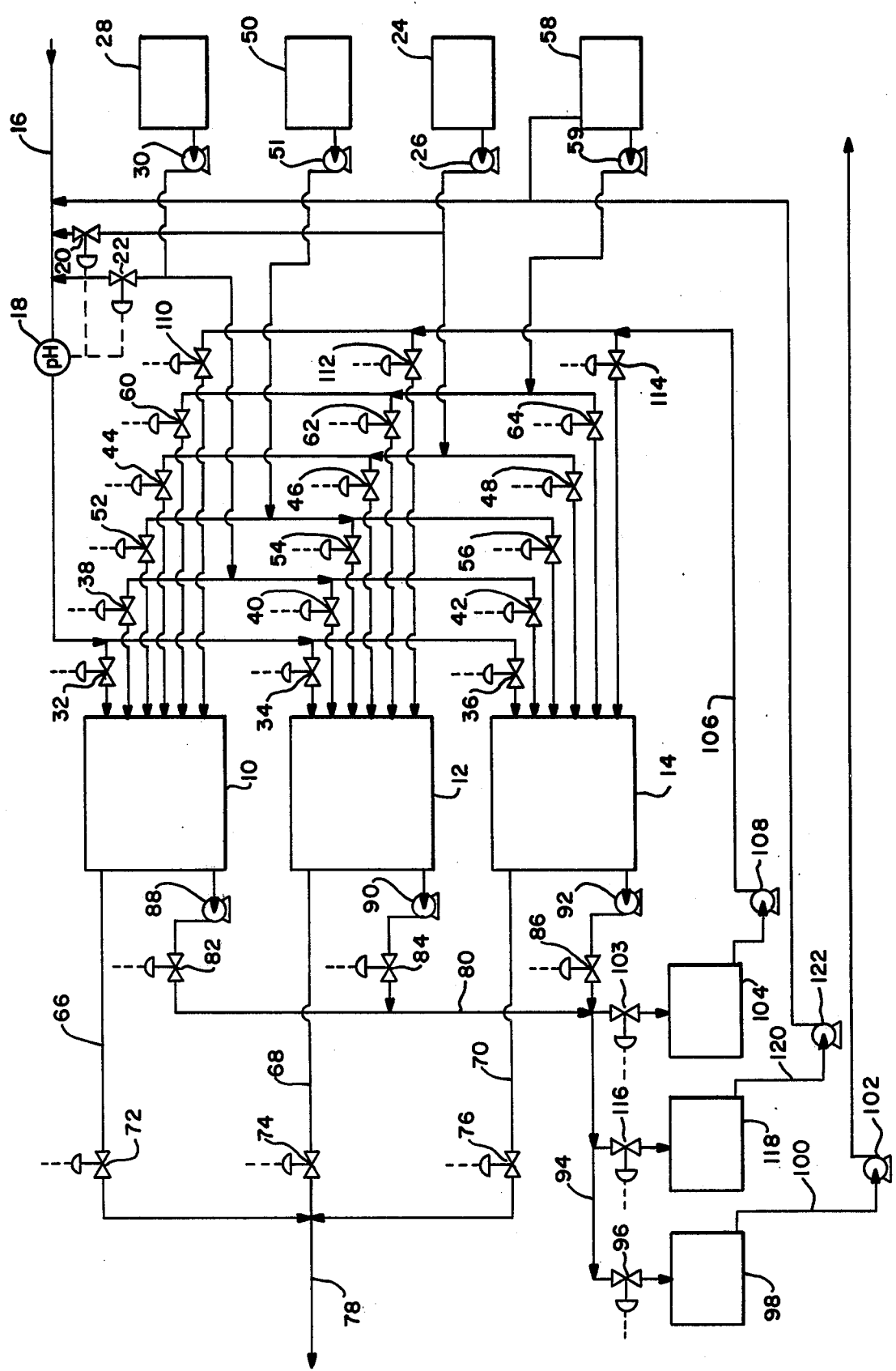

METHOD AND APPARATUS FOR REMOVING HEAVY METALS FROM WASTE WATER STREAMS

BACKGROUND OF THE INVENTION

This invention relates to a process and apparatus for removing heavy metal pollutants from aqueous waste water streams.

A common technique for removal of heavy metals from such streams is by the addition of hydroxide or sulfide to the streams to produce a precipitate. However, this precipitate forms a sludge which is difficult to dispose of because of the tendency of components of the sludge to become soluble in time which results in a serious leachate problem. Also, it is extremely difficult to process the sludge for recovery of soluble components in the same. Furthermore, the sulfide precipitation process evolves hydrogen sulfide, a noxious and toxic gas. Finally, neither of these processes are capable of providing the low residual concentrations called for in actual and pending legislation regulating the allowable concentration of heavy metals in domestic and industrial waste water.

Recently, an approach has been suggested for the removal of heavy metals from waste water streams by a starch xanthate process as set forth in the following papers: Wing, R. E., "Heavy Metal Removal from Waste Water with Starch Xanthate", paper presented at the 29th Purdue Industrial Waste Conf., Lafayette, Ind., May 7-9, 1974; and Wing, R. E., et al, "Insoluble Starch Xanthate: Use in Heavy Metal Removal", unpublished report, North Regional Research Laboratory, U.S.-D.A., Peoria, Ill., August, 1974. In accordance with this process, the waste water is contacted with an insoluble starch xanthate formed by the reaction of a highly crosslinked starch in alkaline slurry with carbon disulfide. The metal ions in the waste water form an insoluble metal xanthate complex with the starch substrate which is stated in the papers to be separable from the waste water by filtration or other dewatering means. The papers also state that the heavy metals can be stripped from the starch by acid treatment resulting in metal recovery and that the starch can be rexanthated and recycled.

Experiments have been performed in accordance with the above starch xanthate process. However, it has been found that the starch xanthate residue from contact with the waste water stream forms a gelatinous mass which is extremely difficult to handle and dewater. Settling of the suspended material is slow and the supernatant liquids are turbid and cloudy. Upon filtration, the suspended material and residue form a cohesive mass on the filter paper which can only be removed by scrapping of the filter. This filter cake is of a sticky and gummy nature which is not conducive to ready handling on an industrial scale, especially if the material is to be rexanthated.

Another unexpected problem with the starch xanthate is that use in a wetted slurry form does not reduce the residual heavy metal content to the desired low level in contrast to use in dry form. However, drying of the starch xanthate after formation is an expensive procedure.

In view of the foregoing, it would be beneficial to provide an improved and efficient method of heavy metal removal from waste water based upon the xanthate complexing principle while avoiding the deficiencies of handling starch xanthate.

SUMMARY OF THE INVENTION AND OBJECTS

In accordance with the present invention, fibrous insoluble cellulose xanthate (e.g., sodium based) is contacted with aqueous waste water containing heavy metal pollutants which are chemisorbed on the cellulose xanthate as an insoluble metal complex. Thereafter, the complex is separated from the waste water stream and the heavy metals are stripped, as by contact with acid, to produce a cellulose residue. Such cellulose may be rexanthated and recycled for further heavy metal removal in a continuous process. The heavy metals stripped from the cellulose xanthate can be treated to produce a saleable metal by-product of the waste water treatment process. One suitable form of cellulose xanthate is a porous bed of fixed dimension through which the waste water stream is passed during treatment. In another form, the cellulose xanthate is comminuted in form and is permitted to gravitate through a volume of a solution and separated as by sedimentation, filtration, or centrifugation.

It is an object of the present invention to provide an efficient and economical process for removing heavy metal pollutants from an aqueous waste water stream which overcomes the aforementioned disadvantages of prior art processes.

It is another object of the invention to provide a process for the foregoing type in which the heavy metals are readily recovered.

It is a further object of the invention to provide a process of the foregoing type which avoids the concommitment formation of residual sludge which is difficult to handle.

It is a further object of the invention to provide a process of the foregoing type in which the heavy metals are chemisorbed onto a substrate and are subsequently stripped for recovery with the substrate being regenerated.

Additional objects and features of the present invention will also be apparent from the following description taken in conjunction with the accompanying drawing.

BRIEF DESCRIPTION OF THE DRAWING

The drawing is a schematic representation of apparatus suitable for performing the present process in a continuous manner.

DETAILED DESCRIPTION OF THE PREFERRED EMBODIMENTS

In accordance with the present invention, a fibrous metal base cellulose xanthate substrate is employed for the removal of heavy metals from waste water. The sodium-base cellulose xanthate is preferred as being the least expensive one. Alternatively, other metal ions such as magnesium, calcium, lithium, potassium ions or combinations of the same may be substituted for the sodium ion. It is believed that the heavy metals are chemisorbed to the xanthate groups on the cellulose for chemisorption. For simplicity of description, the present description will refer to a sodium-base cellulose xanthate substrate by the term "cellulose xanthate". However, it should be understood that the invention is also applicable to the foregoing other metal ions.

Cellulose xanthate is a well known commercial product employed in the formation of rayon, cellophane, and other viscose products. It is conventionally prepared by the reaction of carbon disulfide with cellulose in the presence of a strong aqueous alkali, sodium hydroxide. This formation may be represented by the following chemical equation in which ROH represents cellulose. It is noted that cellulose xanthate comprises shorter chains than the original cellulose because of degradation by the alkali treatment.

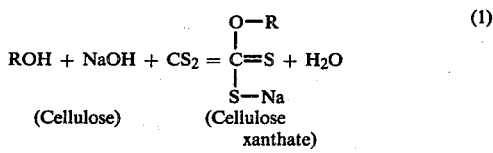

(Cellulose)   (Cellulose xanthate)   (1)

Other reactive metal hydroxides, e.g., magnesium, calcium, lithium and potassium may be employed to form the corresponding xanthate derivative.

Commercially available cellulose xanthate is manufactured at high purity standards to form cellulose or rayon using dissolving grade wood pulp and so may be relatively expensive. Such purity is not required for processing in accordance with the present invention. Thus, for example, common wood pulp may be employed to form the cellulosic treating material with a consequent reduction in cost.

It has been found that heavy metal pollutants in a waste water stream may be removed to exceptionally low levels on the order of micrograms per liter when treated with fibrous cellulose xanthate. The mechanism of transfer of heavy metal pollutants to the cellulose xanthate is believed to be analogous to that of starch xanthate. It is believed that such chemisorption complexing occurs in accordance with the following equation:

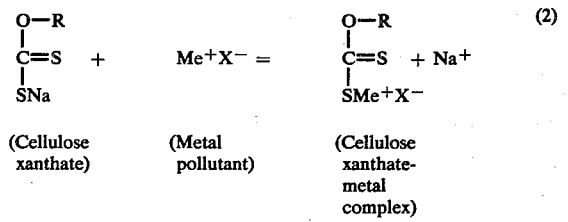

(Cellulose xanthate)   (Metal pollutant)   (Cellulose xanthate-metal complex)   (2)

Based upon the above assumption, the heavy metal pollutants are chemisorbed on the cellulose xanthate fibers and are complexed as an insoluble metal xanthate compound.

The pH level maintained during treatment of the waste water with fiber cellulose xanthate may vary over a relatively broad range. For optimum removal of heavy metals, it is important that the pH be maintained above a level at which the cellulose xanthate begins to decompose or degrade with a resultant loss of its ability to effectively remove heavy metal pollutants. This problem may be avoided by operating the system at a pH of not significantly less than 4.0.

The maximum pH level desirable for the system is one below which significant quantities of heavy metal pollutants are precipitated as hydroxide. The effect of the two mechanisms, chemisorption and hydroxide precipitation, would produce an effluent having extremely low levels of heavy metal pollutants. However, operation at such conditions can be undesirable because of the production of a hydroxide precipitate which may form into a sludge. Such precipitate may complicate the heavy metal removal step in which the metal is stripped from the cellulose xanthate and the regeneration or rexanthation step, to be described in more detail hereinafter. Thus, if the metal values are to be stripped and the substrate regenerated, it is preferable to operate the system below a maximum level of about 11.0 at which excessive amounts of hydroxide sludge may form. However, if such difficulties can be tolerated, operation at a pH level above 11.0 may be employed to attain extremely low residual metal contents in the treated effluent. For the foregoing reasons, it has been found that optimum results are obtained at pH levels between about 6.5 and 10.0. Such levels may be accomplished by pH adjustment of the waste water influent with an acid or base.

The total residence time during treatment of the waste water stream should be sufficient to permit adequate contact with the cellulose xanthate. This, in turn, can be dependent upon the form of the cellulose addition, the quantity of cellulose xanthate, the level of heavy metal pollutants, and the degree of mixing. It has been found that a contact time of 15 to 30 minutes is sufficient for effective removal of heavy metal pollutants. Some improvement is obtained with extensive contact times of up to 120 minutes.

It has been found that the removal of heavy metal pollutants from waste water by the present process is relatively insensitive to temperature within the temperature ranges normally employed for waste water treatment, i.e., from 20° C. to 75° C.

An important feature of the present invention is the fibrous, porous, and inert nature of the cellulose xanthate substrate. After the heavy metals of the waste water stream are chemisorbed onto the cellulose xanthate substrate, it must be separated from the waste water to permit stripping of the heavy metal pollutants from the system. The fibrous nature of the cellulose xanthate greatly facilitates separation of the substrate from the waste water. In one embodiment, the cellulose xanthate is added in a combined form to a vessel or treatment zone. Here, the fibrous cellulose xanthate substrate may be removed from the waste water by common techniques such as (a) sedimentation of the xanthate and removal of the waste water as overflow, (b) filtration, or (c) centrifugation. In another embodiment, particularly suitable for continuous processing, the fibrous nature of the cellulose xanthate substrate permits it to be employed in the form of an object of relatively fixed shape having sufficient structural strength integrity and porosity for use as a bed, cartridge material or matte in a flowthrough contacting reactor.

The quantity of cellulose xanthate to be employed in treating a waste water stream will depend upon the amount of heavy metal pollutants desired to be removed. It has been found that with a cellulose xanthate containing about 20% of substituted sulfur, at least about 0.2 grams of heavy metal pollutants per gram of cellulose xanthate can be chemisorbed and complexed from the waste water. The degree of substitution of sulfur in the cellulose xanthate is inversely related to the amount of heavy metal pollutants sorbed onto the cellulose xanthate. Assuming sufficient cellulose xanthate is provided, the residual heavy metal content of the treated effluent is substantially below any present or contemplated discharge limits.

After the heavy metal is chemisorbed onto the cellulose xanthate, and this material is removed from the waste water, the heavy metals may be stripped from the substrate by breaking the complex and causing the heavy metals to redissolve. A suitable extraction technique for this purpose is by contact of an aqueous acid. This process is capable of producing a relatively concentrated solution in heavy metal content which may be treated, if desired, to recover the valuable heavy metals. Known techniques may be employed for such recovery including precipitation, cementation, electrolysis, or the like.

It is believed that the xanthate portion of the complex is oxidized during stripping of the heavy metals from the substrate by acid extraction producing a residue of cellulose. In a subsequent procedure, this residue may be chemically treated as with carbon disulfide and sodium hydroxide to form a regenerated cellulose xanthate which may be returned to the process. If the xanthate is originally in comminuted form and is thereafter collected in a filtration or centrifugation process, the material again may be comminuted for treatment of a volume of waste water. Alternatively, if the original material is in a fixed shape, such as a bed, it may be regenerated and again employed in a flowthrough contacting reactor.

As used in the present specification and claims, the term "heavy metals" refer to those heavy metal pollutants which are commonly present in waste water streams and which are capable of being chemisorbed onto an xanthate moiety. Such heavy metals conventionally comprise one or more of the following metal ions: lead, chromium, copper, iron, zinc, or mercury.

Referring to the drawing, a schematic representation is illustrated of one system suitable for carrying out the process of the present invention in a continuous manner. At the beginning of operation, each of three flow-through reaction chambers 10, 12 and 14 contain a fixed bed of cellulose porous xanthate in a porous grid retained between screens, not shown, to prevent entrainment of the fibrous particles in the liquid stream. Waste water is supplied in conduit 16 which is provided with a pH control monitor 18 operatively associated with valves 20 and 22. Valve 20 is connected by a line to acid storage tank 24 and associated pump 26. Similarly, valve 22 is connected to sodium hydroxide storage tank 28 and operatively associated pump 30. When the monitor 18 detects a pH level below the desired value, valve 22 is actuated to an open position and sodium hydroxide is pumped from storage tank 28 into the waste water line until the desired pH level is obtained. In like manner, when the pH level is above the desired maximum value, valve 20 is opened for pumping of acid from storage tank 24 to adjust the pH level.

Waste water line 16 is connected to chambers 10, 12 and 14 by valves 32, 34, and 36, respectively. Sodium hydroxide from tank 28 may be supplied selectively to the same three reaction chambers by operation of valves 38, 40, and 42, respectively. Similarly, acid from storage tank 24 may be supplied by selective actuation of respective valves 44, 46 and 48. Carbon disulfide from storage tank 50 may be pumped through pump 51 to said three reaction chambers by selective actuation of valves 52, 54 and 56, while wash water from storage tank 58 may be pumped through pump 59 by selective actuation of valves 60, 62 and 64.

After heavy metal content of the waste water stream is chemisorbed onto the cellulose xanthate in one of chambers 10, 12 or 14, the treated waste effluent is removed in the corresponding one of conduits 66, 68 or 72 provided with valves 72, 74 and 76 for discharge to conduit 78 for disposal or recycle.

For the mode in which metal is stripped from the cellulose xanthate, waste water to the selected reaction chamber is discontinued and acid from storage tank 26 is transported by appropriate valving to that reaction chamber for removal in line 80 through one of valves 82, 84, or 86, through one of pumps 88, 90 or 92, respectively. The stream containing stripped metal is passed in relatively concentrated form through line 80 to line 94 through valve 96 into metal recovery storage tank 98. If desired, such heavy metal containing solution may be pumped through outlet line 100 and pump 102 for an appropriate metal recovery processing.

During regeneration of the cellulose, sodium hydroxide from storage tank 28 and carbon disulfide from storage tank 50 are supplied to the selected reaction chamber to rexanthate the stripped cellulose fiber. In this mode, line 80 removes excess sodium hydroxide and carbon disulfide from the reaction chamber through valve 103 to storage tank 104 for recycle in line 106 through pump 108 to the selected chamber through valves 110, 112 or 114. After rexanthation, the cellulose is washed with water from storage tank 58 through one of valves 60, 62 or 64. During this washing step, spent wash water from the reaction chamber flowing through line 80 is passed through valve 116 into wash water storage tank 118 for recycle in line 120 through pump 122 into the waste water conduit 16.

Operation of the system of FIG. 1 will be first described with respect to reaction chamber 10. Waste water containing heavy metal in conduit 16 flows past pH monitor 18 which, if necessary, adjusts the pH level by the addition of acid or base from storage tanks 24 or 28. Then, the waste water is passed through valve 32 into reaction chamber 10 containing a porous grid of cellulose xanthate. The heavy metals in the waste water are chemisorbed and complexed with the cellulose xanthate substrate. The treated waste water, low in heavy metal contact, is discharged through conduit 66 and open valve 76 into conduit 78 for ultimate disposal.

Concurrently, the reaction chamber 12 is assumed to contain cellulose xanthate complexed with heavy metal which is chemisorbed from a waste water stream which had previously been passed through the same in a manner analogous to that described above with respect to reaction chamber 10. The heavy metal is stripped from the cellulose xanthate by passing acid from storage tank 24 through valve 46, into the reaction chamber. The resulting stripped metal solution is pumped through open valve 84 into discharge line 80 through valve 96 and into metal recovery storage tank 98. This concentrated acid solution of heavy metal pollutants from a stripping operation is transported to subsequent metal recovery operations.

At the same time as waste water treatment in chamber 10 and the metal stripping in chamber 12, cellulose xanthate in chamber 14 which has previously been employed for waste water treatment, as in chamber 10, and stripped, as in chamber 12, is regenerated. For this purpose, carbon disulfide from storage chamber 50 and sodium hydroxide from storage chamber 28 are pumped through valves 48 and 42, respectively, into chamber 14 to rexanthate the cellulose medium. Excess solution from chamber 14 passes through valves 86 and 103 into storage tank 104 for recycling in line 106 and through valve 114 is recycled to chamber 14 as a make-up solution or is stored for a subsequent regeneration step.

After rexanthation, valves 42, 48 and 114 are shut off and wash water from storage tank 58 is admitted through valve 64 into reaction chamber 14. The washing solution effluent passes through valve 86 and 116 through wash water storage tank 118 for pumping back to waste water line 16 for treatment.

By appropriate modification in the valving, each of reaction chambers 10, 12 and 14 may be used successively as a treating chamber, a metal stripping chamber, and a cellulose xanthate regeneration chamber.

It is apparent from the foregoing description that a continuous automatic apparatus has been provided for treatment of waste water containing heavy metals by cellulose xanthate in which the heavy metals may be recovered and the cellulose residue rexanthated for recycling into the system. Other apparatus may be provided for accomplishing the above objective. For example, a porous bed of cellulose xanthate fibers may be provided on a movable screen, such as of the endless belt type, with the waste water directed as downwardly to flow through the cellulose xanthate fibers. When the section of cellulose xanthate fibers has chemisorbed its capacity of heavy metal pollutants, the screen is indexed to a position in which fresh cellulose xanthate is exposed to waste water stream and the spent cellulose xanthate successively enters metal removal and cellulose xanthate regeneration zones before being returned for use in the treatment of waste water stream.

In another embodiment of the invention, not shown, the cellulose xanthate medium may be contacted batchwise with a quantity of waste water in a suitable tank and retained in contact with the waste water until the heavy metal pollutants are chemisorbed. Then the cellulose xanthate-metal complex is separated by filtration, centrifugation, sedimentation or other solids-liquid separation techniques. The treated waste water may be disposed of to a receiving stream or recycled for other use. The separated cellulose xanthate-metal complex substrate may be subjected to metal removal and rexanthation steps prior to reuse in removing additional heavy metal pollutants from a further waste water stream.

A further disclosure of the nature of the present invention is provided by the following specific examples of the practice of the invention. It should be understood that the data disclosed serve only as examples and are not intended to limit the scope of the invention.

EXAMPLE 1

In this test, cellulose xanthate was prepared in the laboratory by reacting 35 grams of common wood pulp, 8 grams of caustic (NaOH) in a 2N solution, and 6.5 grams of carbon disulfide. One-half (0.5) grams of the cellulose xanthate was placed in 250 ml of a simulated waste water containing 12 mg of lead per liter of solution and having a pH of 7.1. The mixture was agitated gently for 30 minutes at room temperature and the cellulose xanthate fibers separated from the solution by filtration. The clear filtrate was analyzed and contained 0.015 mg of lead per liter.

EXAMPLE 2

Cellulose xanthate prepared in the laboratory similarly to the procedure described in Example 1 was added in the amount of 0.5 gram to 250 ml of a simulated waste water containing 12 mg of lead and 3 mg of copper per liter of solution at an initial pH of 6.9. The pH of the solution was adjusted to pH 8.5 by the addition of a small amount of calcium hydroxide and the mixture gently agitated for 30 minutes at room temperature. Following separation of the cellulose xanthate fibers by filtration, the clear filtrate analyzed 0.046 mg of lead and 0.330 mg of copper per liter.

EXAMPLE 3

A simulated waste water solution was prepared containing in mg per liter, the following components: lead—0.8; zinc—0.33; and iron—4.5. Commercial cellulose xanthate in the amount of 0.3 gram was placed in 500 ml of this solution and pH adjustment made with calcium hydroxide to a pH of 8.5. The mixture was agitated gently for 30 minutes at room temperature and the cellulose xanthate fibers separated by filtration. The filtrate analyzed, in mg per liter: lead—0.035; zinc—0.100; and iron—0.250.

EXAMPLE 4

An actual waste water sample from a manufacturing operation was obtained containing, in mg per liter: lead—3.9; zinc—1.0; copper—1.6; iron—31.0; and chromium—0.30. The pH of this sample was 3.5. Commercial cellulose xanthate in the amount of 0.3 gram was contacted with 1500 ml of this waste water after adjustment of the pH to pH 8.5 with caustic (NaOH). Contact time was 30 minutes at room temperature and after separation of the cellulose xanthate by filtration, the clear filtrate contained, in mg per liter, the following amounts of metals: lead—0.007; zinc—0.025; copper—0.120; iron—0.150; and chromium—0.075.

EXAMPLE 5

The test described in Example 4 was repeated except 0.15 gram of commercial cellulose xanthate was used. The clear filtrate analyzed, in mg per liter, as follows: lead—0.009; zinc—0.025; copper—0.100; iron—0.360; and chromium—0.069.

EXAMPLE 6

The test described in Example 4 was repeated except that 0.6 gram of cellulose xanthate was added. The clear filtrate analyzed 0.008 mg of lead per liter and the amount of the residue obtained by filtration was determined. The residue weighed 1.1 grams. The test was again repeated with the exception that no cellulose xanthate was added and calcium hydroxide was used to adjust the pH of the waste water to pH 8.5. On filtration of of latter solution, the clear filtrate analyzed 0.700 mg of lead per liter and the amount of solids residue was 32.1 grams. This example illustrates the great disparity in heavy metal pollutant removal efficiency and in sludge production rates between the cellulose xanthate process and a commercial hydroxide precipitation process for removing heavy metal pollutants.

EXAMPLE 7

Cellulose xanthate was prepared in the laboratory as described in Example 1. The cellulose xanthate media was loosely packed in a vertical 25-mm diameter glass tube and a simulated waste water solution containing 12 mg of lead and 3 mg of copper per liter of solution was slowly introduced into the bottom of the column at a rate to give a retention time in the column of 30 minutes. The overflow from the top of the column was analyzed for lead and copper and contained, in mg per liter, the following amounts: lead—0.037; and copper—0.450.

EXAMPLE 8

The residue obtained in the first part of Example 6 by cellulose xanthate treatment was contacted with 500 ml of 10 percent nitric acid for approximately 10 minutes at room temperature. The cellulose residue was separated from the solution by filtration and the clear filtrate was analyzed for metal content. The results were as follows, in mg per liter; lead—11.4; zinc—3.0; copper—2.3; iron—91.1; and chromium—0.70.

EXAMPLE 9

The cellulose residue from Example 8 was reacted with 0.15 g of caustic (NaOH) in a 2N solution with 0.14 gram of carbon disulfide. The rexanthated cellulose was contacted with 1000 ml of the waste water solution used in Example 4 for 30 minutes at room temperature. The clear filtrate analyzed, in mg per liter: lead—0.033; zinc—0.037; copper—0.134; iron—0.375; and chromium—0.068.

What is claimed is:

1. A method for removing heavy metals from a waste water stream comprising:
   (a) passing the waste water stream containing heavy metals through a porous fibrous filter bed in a treatment zone, said bed being formed of a chemisorbing agent consisting essentially of a water-insoluble fibrous cellulosic substrate consisting of a metal base cellulose xanthate, for sufficient contact time to chemisorb at least a portion of the heavy metals on said cellulosic substrate, said metal being selected from the group consisting of sodium, magnesium, calcium, lithium, potassium, or combinations thereof, and
   (b) separating said heavy metal chemisorbed cellulosic substrate from said waste water stream.

2. The method of claim 1 in which said cellulosic substrate comprises sodium-base cellulose xanthate.

3. The method of claim 1 in which the pH level of said aqueous stream during treatment ranges between about 4.0 and 11.0.

4. The method of claim 3 in which a pH adjusting agent selected from the group consisting of acid or base is added to the waste water stream to adjust the pH value of the aqueous stream to a level desired for treatment.

5. The method of claim 1 in which heavy metals in said aqueous waste water stream comprise one or more metal ions selected from the group consisting of lead, chromium, copper, iron, zinc, mercury and mixtures thereof.

6. The method of claim 1 together with the steps of:
   (c) stripping the heavy metals from said separated chemisorbed cellulosic substrate with a stripping solution, and
   (d) removing and recovering said heavy metals from said stripping solution.

7. The method of claim 6 in which said cellulosic substrate is treated with acid in step (c) to strip the metal ions.

8. The method of claim 6 in which the stripped cellulosic substrate of step (d) is chemically treated by reaction with carbon disulfide and aqueous metal hydroxide to form regenerated cellulose xanthate.

9. The method of claim 8 in which the regenerated cellulose xanthate substrate is recycled to a treatment zone for additional heavy metal chemisorption from a waste water stream.

10. The method of claim 8 in which said metal hydroxide is sodium hydroxide.

11. The method of claim 1 in which the heavy metals chemisorbed on said bed are stripped and recovered.

12. An apparatus for removing heavy metals from an aqueous stream comprising conduit means for said aqueous stream connected to means defining a flowthrough liquid treatment chamber having an outlet therein, a porous fibrous cellulosic material substrate fixed bed, means for retaining said fixed bed in a stationary position in said treatment chamber, said cellulosic substrate comprising a metal base cellulose xanthate, said metal being selected from the group consisting of sodium, magnesium, calcium, lithium, potassium, or combinations thereof.

13. The apparatus of claim 12 in which said cellulosic substrate comprises sodium-base cellulose xanthate.

14. The apparatus of claim 13 in which said cellulosic substrate comprises a porous grid.

* * * * *